United States Patent
Payne et al.

(10) Patent No.: US 7,856,906 B2
(45) Date of Patent: Dec. 28, 2010

(54) GEAR ASSEMLBY INCLUDING A WEAR COMPONENT FOR USE WITH METAL HOUSINGS

(75) Inventors: David A. Payne, Phoenix, AZ (US); Milton J. Keck, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 680 days.

(21) Appl. No.: 11/755,990

(22) Filed: May 31, 2007

(65) Prior Publication Data

US 2008/0298958 A1 Dec. 4, 2008

(51) Int. Cl.
*F16H 57/04* (2010.01)
(52) U.S. Cl. .................................... 74/606 R
(58) Field of Classification Search ............... 74/606 R; 415/196; 418/206.7, 206.8
See application file for complete search history.

(56) References Cited

U.S. PATENT DOCUMENTS

| | | | | |
|---|---|---|---|---|
| 2,511,660 A | * | 6/1950 | Wilson | 418/196 |
| 3,174,435 A | * | 3/1965 | Sisson et al. | 418/132 |
| 4,253,808 A | | 3/1981 | White | |
| 4,336,006 A | * | 6/1982 | Grabow et al. | 418/131 |
| 5,417,556 A | * | 5/1995 | Waddleton | 418/132 |
| 6,213,745 B1 | * | 4/2001 | Woodcock et al. | 418/206.7 |
| 6,454,552 B1 | * | 9/2002 | Hansen et al. | 418/206.5 |
| 2003/0044299 A1 | * | 3/2003 | Thomas et al. | 418/206.9 |

FOREIGN PATENT DOCUMENTS

WO    2005057048 A1    6/2005

* cited by examiner

*Primary Examiner*—Vicky A Johnson
(74) *Attorney, Agent, or Firm*—Ingrassia Fisher & Lorenz, P.C.

(57) ABSTRACT

A gear assembly is provided for use in a metal housing having a bore formed therein. The gear assembly includes a plurality of rotating gear members and at least one bushing for supporting the plurality of rotating gear members. A wear component, defined by a ring-like structure and including an opening defined therein, is provided. The plurality of rotating gear members are disposed within the opening of the wear component. The wear component is received inside of and in close tolerance with the bore. The wear component is in direct contact with the plurality of rotating gear members thereby minimizing damage to an interior surface of the bore.

18 Claims, 6 Drawing Sheets

GEAR ASSEMLBY INCLUDING A WEAR COMPONENT FOR USE WITH METAL HOUSINGS

TECHNICAL FIELD

The present invention relates to gear assemblies for use in metal housings, and more particularly, to a method for preventing damage to such housings.

BACKGROUND

Aircraft engines, including turbofan jet engines, turbojet engines, and turbine engines such as auxiliary power units, typically employ various housings for the disposal of pumps, valves, actuators, and gearboxes. These housings include bores and cavities formed therein within which shafts, gears, pistons, or other rotating or moving parts that couple to the pumps, valves, actuators, or gearboxes, are also disposed. In many cases, the engine may be configured such that a rotating or moving part contacts a surface of the housing.

During operation of the engine, the housing may become worn. For example, the contact between the rotating or moving parts and the housing may result in wear to the surfaces thereof. High pressure fluid flow through the housing bores, such as in a fuel or oil pump, may cause erosion of housing surfaces. Additionally, the housing may be exposed to extreme temperatures, which can impose stress on the aircraft engine and the housing, potentially causing wear thereon. In other examples, the housing may experience vibration during operation, which may also potentially cause housing wear.

Conventionally, housings that are subject to the above-mentioned types of wear are repaired using plating, metal spray, or epoxy-based coatings that are applied to the worn section of the housing. Although these repair techniques are adequate in some circumstances, they may suffer from certain drawbacks. For example, plating and metal spray techniques may not yield desired results, and epoxy-based coatings, because of their relatively low melting temperatures, typically are not well-suited for repair of aircraft parts. As a result, when a housing is not repairable, it is generally discarded. However, because gearbox housings are relatively expensive to manufacture, or may not be commercially available, discarding and replacing the housing generally is not a desirable solution.

Thus, there is a need for a robust and low cost wear component that when used in conjunction with the rotating and/or moving parts that contact the gearbox housing, prevents damage to the housing. Moreover, there is a need for a wear component that is easily replaceable within the housing when the component has exceeded preset wear tolerances. Furthermore, other desirable features and characteristics of the present invention will become apparent from the subsequent detailed description of the invention and the appended claims, taken in conjunction with the accompanying drawings and this background of the invention.

BRIEF SUMMARY

The present invention provides a gear assembly including a wear component for use with metal housings.

In one embodiment, and by way of example only, the gear assembly comprising: a plurality of rotating gear members; at least one bushing configured to be supporting the plurality of rotating gear members; and a wear component defined by a ring-like structure and including an opening defined therein, wherein the plurality of rotating gear members are disposed within the wear component, the wear component received inside of and in close tolerance with the bore.

In another embodiment, and still by way of example only, the gear assembly comprising: a plurality of rotating gear members; at least one bushing supporting the plurality of rotating gear members; and a wear component defined by a ring-like structure and including an opening defined therein, wherein the plurality of rotating gear members and the at least one bushing are disposed within the wear component, the wear component configured to be received inside of and in close tolerance with the bore.

In still another embodiment, and by way of example only, the gear assembly comprising: a plurality of rotating gear members; at least one bushing supporting the plurality of rotating gear members; and a wear component defined by a ring-like structure and including an opening defined therein, the wear component including a first portion and a second portion, wherein the plurality of rotating gear members are disposed within the first portion and supported by the second portion, the wear component configured to be received inside of and in close tolerance with the bore.

Other independent features and advantages of the preferred gear assembly will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description, it is to be appreciated that the described embodiment is not limited to use in conjunction with a particular type of airplane engine, or even to use in an airplane engine. Thus, although the present embodiments are, for convenience of explanation, depicted and described as being implemented in a fuel pump housing for a airplane engine, it will be appreciated that they can be implemented in various other types of housings having a bore formed therein within which a rotating or moving components may be disposed, and in various other systems and environments, such as, for example, gear pumps used in auxiliary power units and propulsion engine fuel control units.

Figure 1:
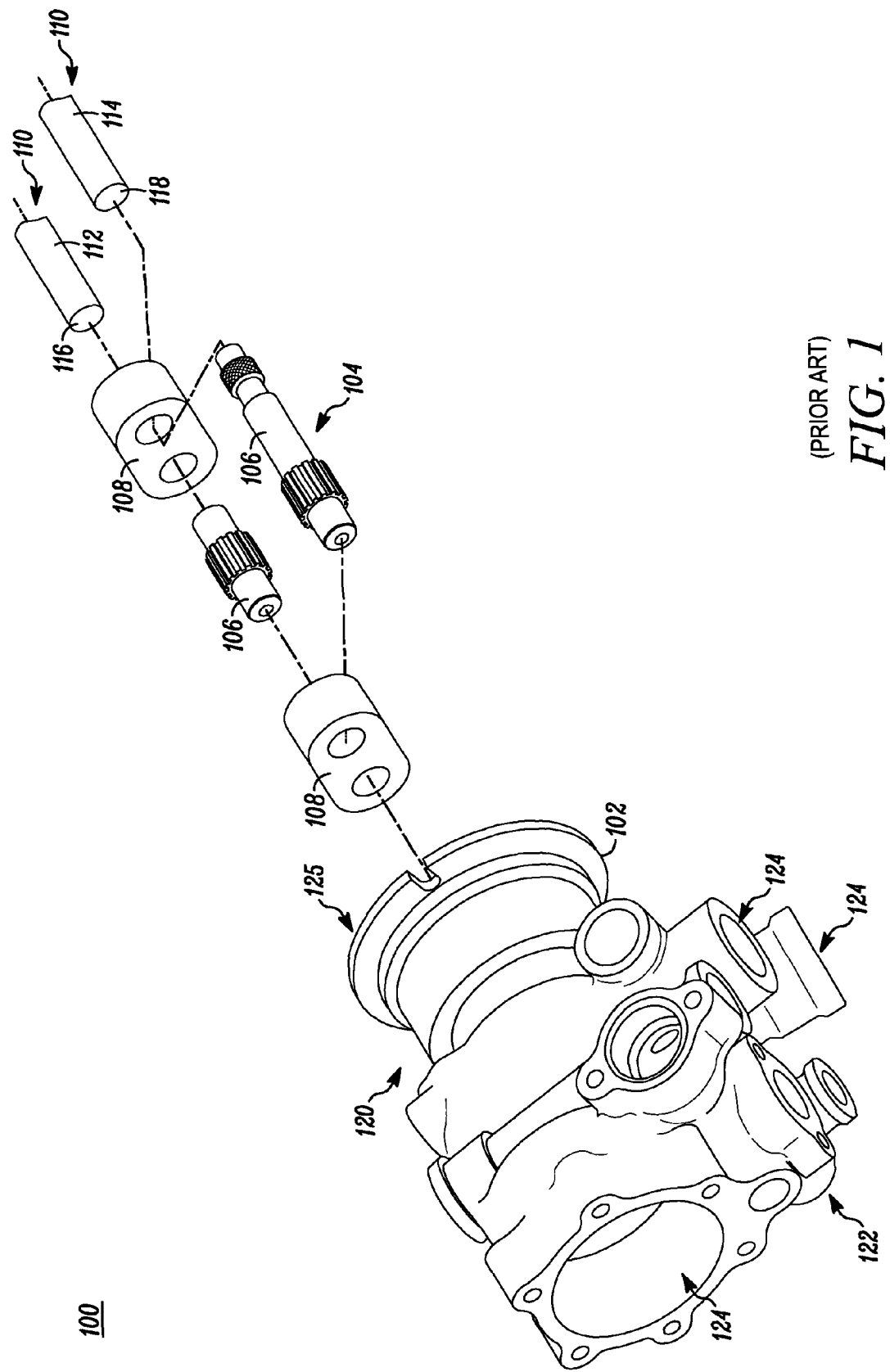
FIG. 1 is an exploded view of a prior art fuel pump housing.

A portion of a prior art embodiment of a fuel pump 100 is depicted in FIG. 1, and includes a gearbox housing 102, a gear assembly 104, including a plurality of rotating gear members 106 and a plurality of bushings 108 configured to support the plurality of rotating gear members 106. In the depicted embodiment a plurality of rotating shafts 110 are coupled to the gear assembly 104 in the form of a first rotating power shaft 112 and a second rotating power shaft 114. The first and second power shafts 112 and 114 each have an end 116 and 118, respectively, that is coupled to the gear assembly 104, and more particularly to each of the plurality of rotating gear members 106.

A portion of the two rotating power shafts 112 and 114 and the associated gear assembly 104, including the plurality of rotating gear members 106 and the plurality of bushings 108, are disposed in the gearbox housing 102. The gearbox housing 102 includes two sections, namely, a main gearbox housing 120 and a secondary gearbox housing 122. The main gearbox housing 120 is configured to receive and contain the gear assembly 104, while the secondary gearbox housing 122 is configured to house additional rotating members (not described). The gearbox housing 102 is typically constructed to withstand thermal, mechanical, and/or environmental stresses and may be made of any one of numerous suitable aluminum alloys or magnesium alloys.

The gearbox housing 102 includes a plurality of bores 124 (only one of which will be described herein) that are formed in a portion of the sidewall thereof and defined by suitably shaped inner surfaces (not shown). A main bore 125 is configured to receive and contain the gear assembly 104 and the ends 116 and 118 of the first and second power shafts 112 and 114. The other bores are configured to receive additional rotating members and provide a seal against leakage of lubricants that are contained therein the gearbox housing 102.

During use, the gear assembly 104, and more particularly, the plurality of rotating gear members 106, may come in contact with an interior surface of the main bore 125 and cause wear. When an interior surface of the main bore 125 is worn during rotating of the gear assembly 104, it may have scratches or the diameter of the main bore 125 may be larger than, or discrepant from, the originally manufactured diameter. As a result, the gearbox housing 102 may become non-useable without repair.

Figure 2:
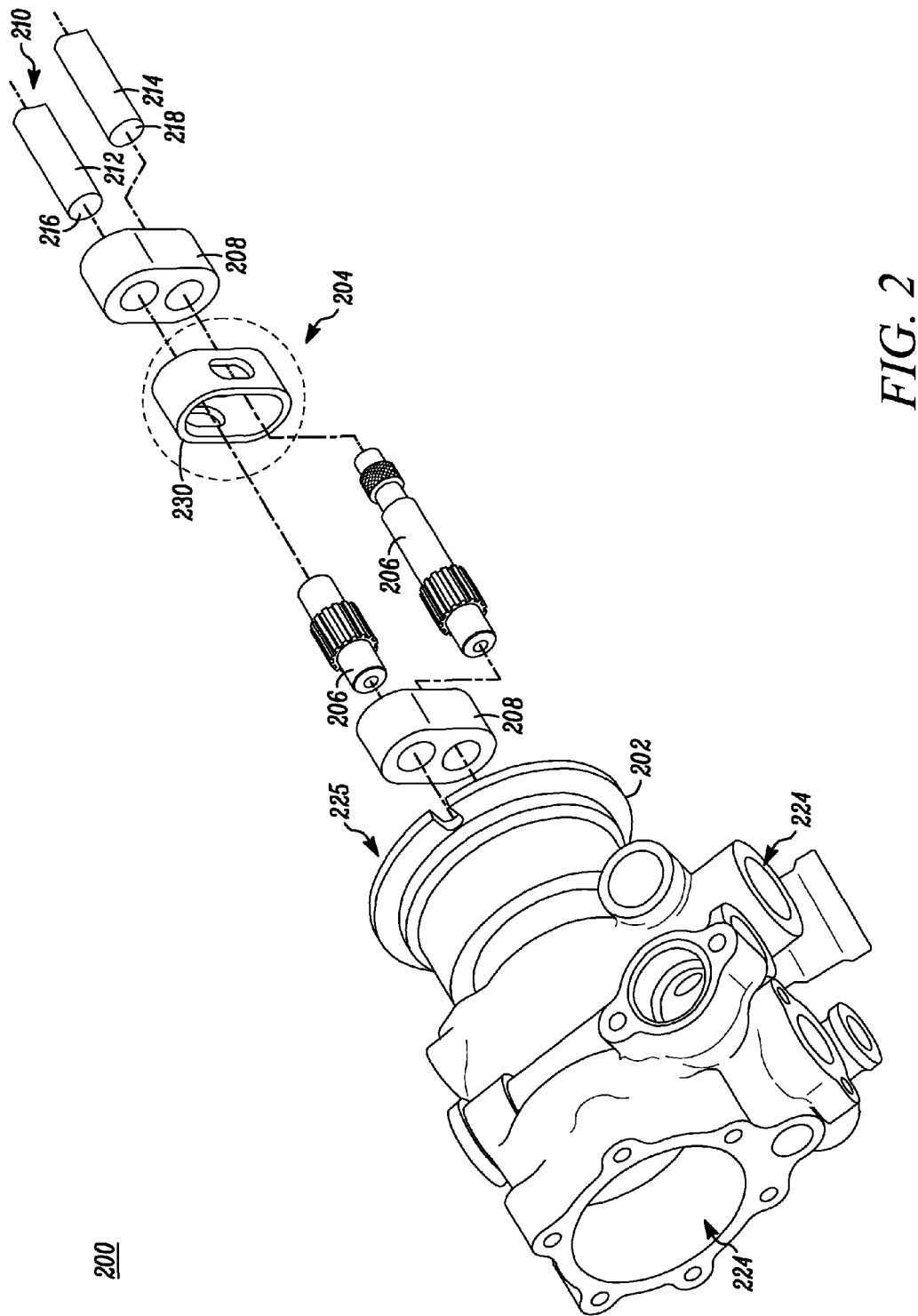
FIG. 2 is an exploded view of an exemplary fuel pump housing including a gear assembly with a wear component.

One exemplary embodiment of a fuel pump that includes a means for minimizing damage to the interior surface of a main bore, similar to main bore 125 of FIG. 1, is depicted in FIG. 2. For ease of explanation, the exemplary embodiment will be described as applied to a main bore 225. As will be appreciated, the means for minimizing damage to the interior surface of the main bore 225 can be applied to other gearbox bores 224 as well, or any other type of bore that is formed in any other type of housing.

Referring more specifically to FIG. 2, a portion of a fuel pump 200 is depicted and includes a gearbox housing 202, a gear assembly 204, including a plurality of rotating gear members 206 and a plurality of bushings 208 configured to support the plurality of rotating gear members 206. In the depicted embodiment a plurality of rotating shafts 210 are coupled to the gear assembly 204 in the form of a first rotating power shaft 212 and a second rotating power shaft 214. The first and second rotating power shafts 212 and 214 each have an end 216 and 218, respectively, that is coupled to the gear assembly 204, and more particularly to each of the plurality of rotating gear members 206.

In this particular embodiment, gear assembly 204 further includes a wear component 230 that is positioned to surround the plurality of rotating gear members 206. As illustrated in an enlarged view in FIG. 3, the wear component 230 is sandwiched between the plurality of bushings 208. The wear component 230 is generally a ring-shaped structure having a central opening 232 for positioning of the plurality of rotating gear members 206. The wear component 230 further includes an inlet port 234 and an outlet port 236 for the passage of fluids therethrough.

The gear assembly 204, including the plurality of rotating gear members 206, the wear component 230, and the plurality of bushings 208, are disposed in the gearbox housing 202. Similar to the prior art previously described, the gearbox housing 202 includes a main bore 225 that is formed in a portion of the sidewall thereof and defined by suitably shaped inner surfaces (not shown). The main bore 225 is configured to receive and contain the gear assembly 204, including the plurality of rotating gear members 206, the wear component 230, and the ends 216 and 218 of the first and second rotating power shafts 212 and 214.

Figure 3:
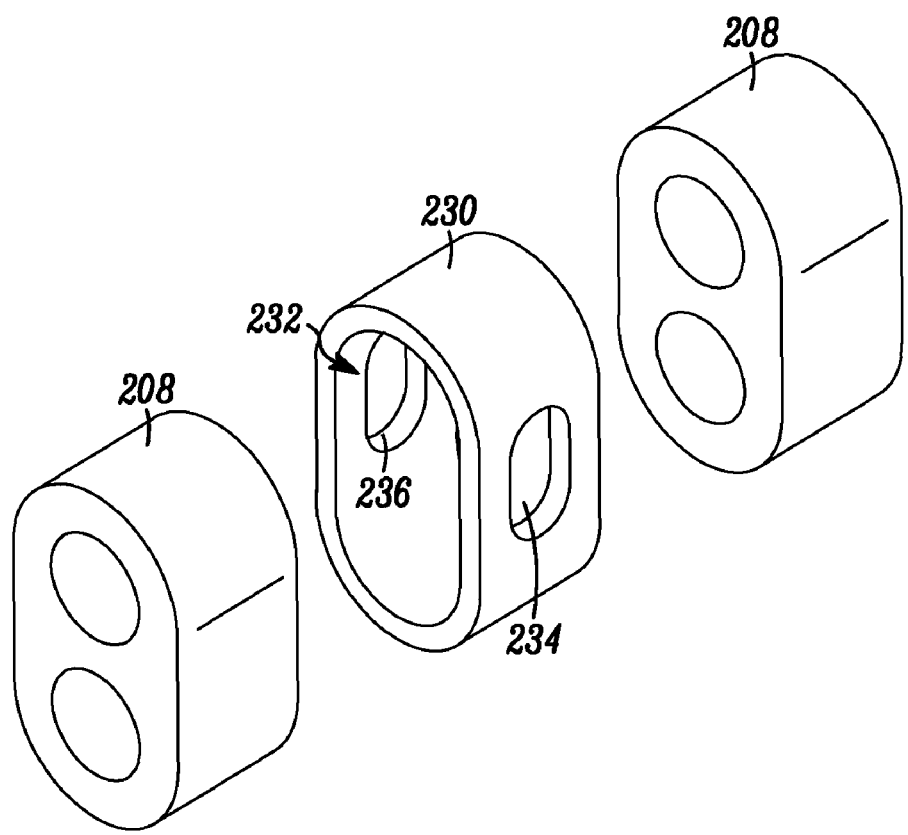
FIG. 3 is close up exploded view of a first embodiment of a portion of a gear assembly including a wear component.
Figure 3:
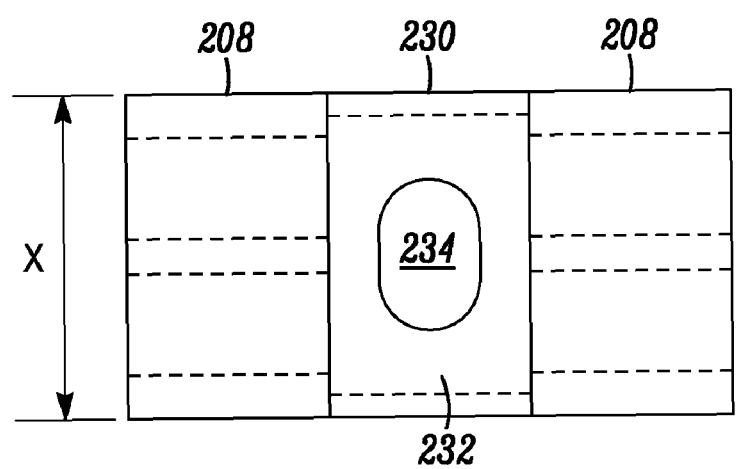

The wear component 230 is constructed having an outside diameter, referenced x in FIG. 3, and in close tolerance to the diameter of the main bore 225 of the gearbox housing 202. The gear assembly 204 is received inside of and in close tolerance with the main bore 225. During use, the plurality of rotating gear members 206 do not contact an interior surface of the main bore 225 and cause wear. With the inclusion of the wear component 230, any damage by the plurality of rotating gear members 206 occurs to an interior surface of the wear component 230, which is easily replaceable by simply removing the damaged wear component 230 and replacing it with a new wear component. In a preferred embodiment, the gear assembly 204, including the wear component 230, may be configured as a cartridge-like assembly, thereby allowing for ease in removal and replacement.

Figure 4:
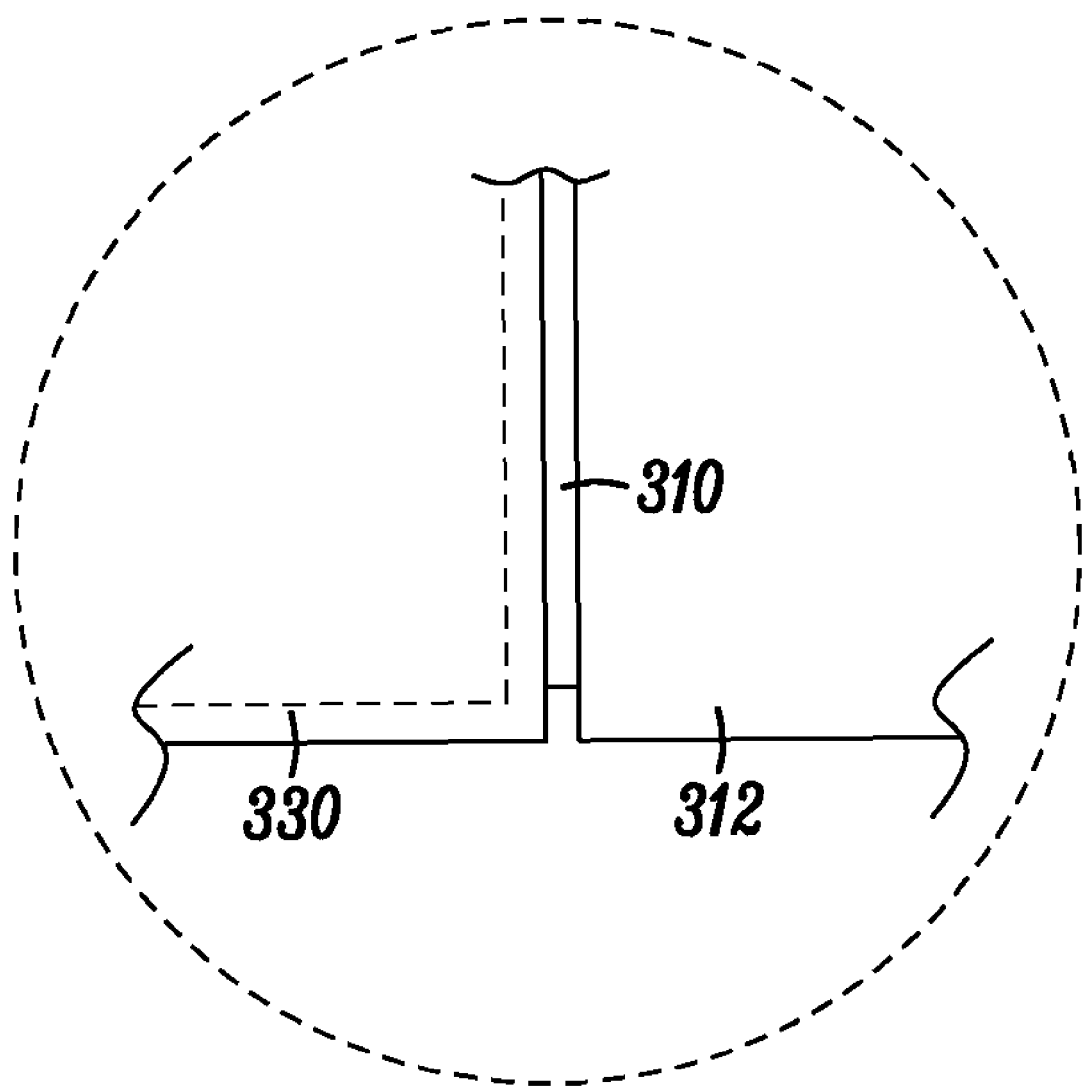
FIG. 4 is a partial cross sectional view of a second embodiment of a portion of a gear assembly including a wear component.

Referring now to FIG. 4, illustrated is an enlarged view of a portion of a wear component 330, similar to the wear component 230 of FIGS. 2 and 3. In this particular embodiment, the wear component 330 is configured about its exterior to allow for the formation of a gap 310 between the wear component 330 and a plurality of bushings 312. More particularly, the wear component 330 is configured to provide for the insertion therein of at least a portion of at least one of the plurality of bushings 312. The formation of the gap 310 allows the bushing 312 to float relative to the wear component 330 and maintain zero side clearance on the rotating gear members. In a preferred embodiment, the gear assembly may include at least one small wave-spring (not shown) installed under the bushing 312 to pre-load the assembly so that fluid does not leak at the sides of the gears making for a more efficient pump.

Figure 5:
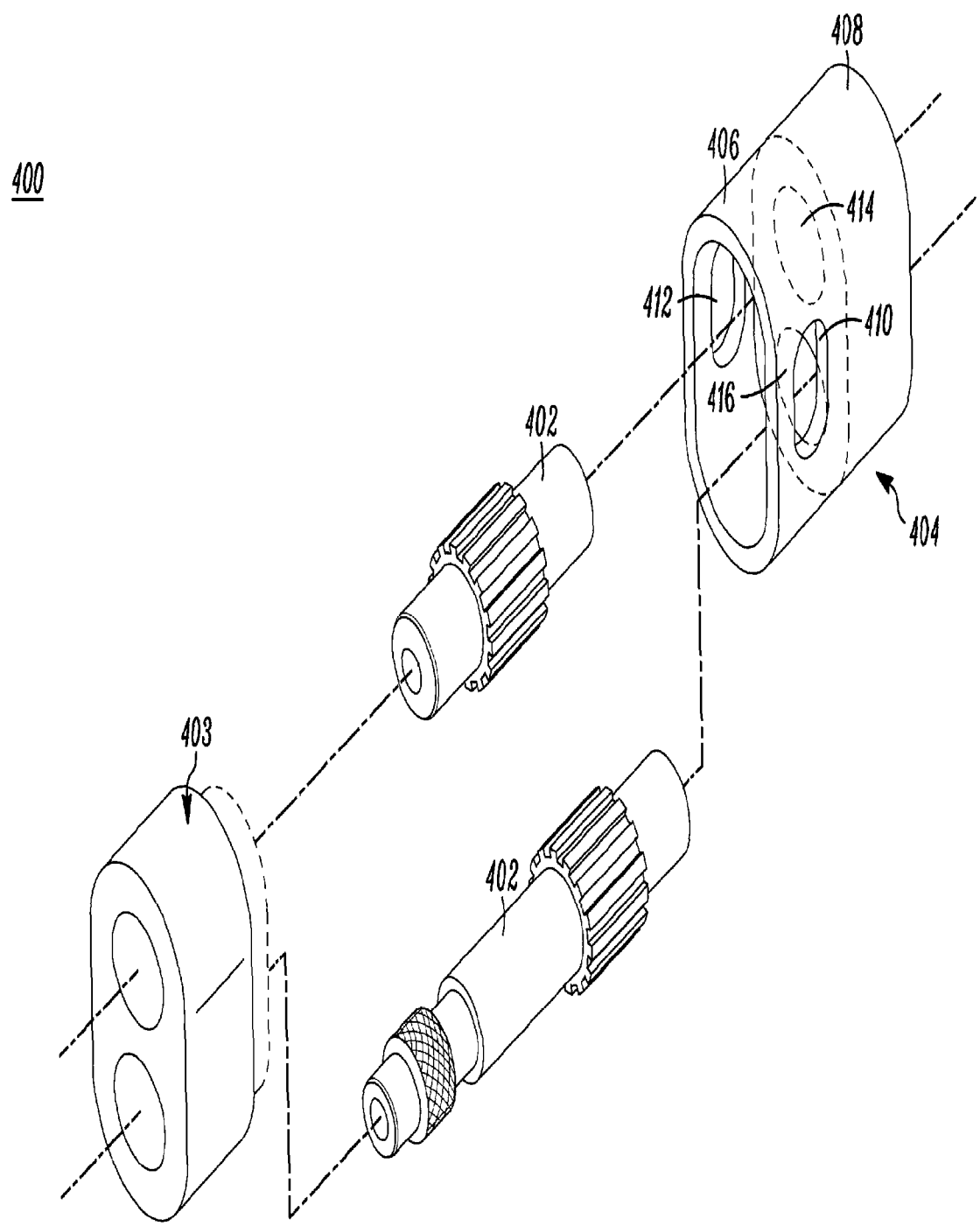
FIG. 5 is a close up exploded view of a third embodiment of a portion of a gear assembly including a wear component.

In yet another alternative embodiment, as best illustrated in FIG. 5, a gear assembly 400 is illustrated including a plurality of rotating gear members 402, at least one bushing 403, and a wear component 404 configured to include a second bushing. More specifically, the wear component 404 includes a first portion 406 that acts similar to the previously described wear components, and further includes an integrally formed portion 408 that serves as a second bushing and supports the plurality of rotating gear members 402. The wear component 404 in this particular embodiment includes the second bushing and is formed as a one-piece component initially by molding or by conjoining two separately formed components.

Similar to the previously described components, the wear component 404 includes and inlet port 410 and an outlet port 412, for the passage therethrough of fluids. The inlet port 410 and the outlet port 412 may be formed including specific edge geometries, such as radiuses, to further prevent cavitation that may occur during the flow of fluids through the wear component 404. In addition, the wear component 404 includes a first bore 414 and a second bore 416 for the positioning of the plurality of rotating gear members 402. In this particular embodiment, the wear component 404 is preferably formed of a carbon/graphite due to its high wear resistance, high compressive strength, and ability to withstand high temperatures for extended periods. In the alternative, other materials could be acceptable, as well, such as composites, bronze, brass, or the like.

Figure 6:
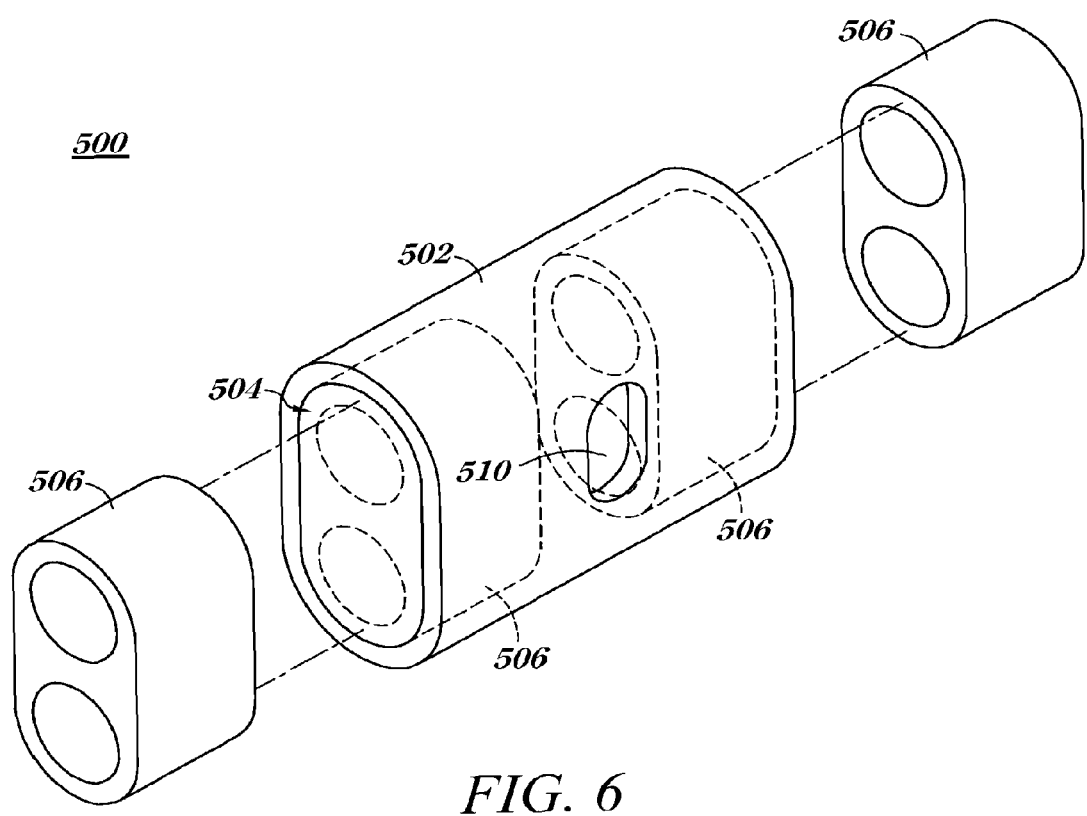
FIG. 6 is a close up exploded view of a fourth embodiment of a portion of a gear assembly including a wear component.

Referring now to FIG. 6, illustrated is yet another embodiment of a portion of a gear assembly 500 for use in a fuel pump as previously detailed. In this particular embodiment, the gear assembly 500 includes a wear component 502, configured as a substantially ring-shaped structure, having an opening 504 therein for positioning of a plurality of rotating gear members (not shown). The opening 504 is dimensioned to enable positioning within opposed ends of the wear component 502, a plurality of bushings 506. The bushings 506 are configured having an exterior dimension in close tolerance to the dimension of the opening 504 so as to allow for positioning of the bushings 506 inside of and in close tolerance with the wear component 502. Similar to the previously described embodiments, the wear component 502 further includes an inlet port 510 and an outlet port (not shown) for the passage therethrough of fluids.

During assembly, a plurality of rotating gear members (not shown), generally similar to the rotating gear members 206 of FIG. 2, are positioned within the wear component 502 and supported by the plurality of bushings 506. In a preferred configuration, the plurality of bushings 506 are disposed completely within the wear component 502 and provide for a compact, easily replaceable gear assembly 500.

There has now been provided a wear component for use with metal housings that is inexpensive and relatively simple to fabricate and position within a housing. Moreover, the wear component allows for damage typically caused by the rotating gear members upon an interior surface of the housing, to be substantially eliminated. During operation, the wear component is in direct contact with the rotating gear members, thereby eliminating any damage to the housing. Wear previously occurring to the pump housing is transferred to the wear component which is easily replaced. In addition, the inclusion of a wear component as described herein can be used to repair and thus allow for re-use of a housing that has incurred excessive wear so that the component is salvaged and not discarded.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A gear assembly, comprising:
   a gearbox housing having a bore therein;
   a plurality of rotating gear members mounted within the gearbox housing;
   at least one bushing disposed within the bore and supporting the plurality of rotating gear members;
   a wear component matingly received within the bore proximate the at least one bushing, the wear component comprising a ring-shaped structure disposed around the plurality of rotating gear members to prevent wear between the plurality of rotating gear members and the inner surface of the gearbox housing defining the bore, the wear component slidably disposed within the bore such that the wear component is retained in a desired position when the gear assembly is assembled and is freely removable from the bore when the gear assembly is disassembled to facilitate replacement of the wear component; and
   an inlet port formed through a first sidewall of the ring-shaped structure; and
   an outlet port formed through a second sidewall of the ring-shaped structure and cooperating with the inlet port to define a flow passage extending traversely through the wear component.

2. A gear assembly as claimed in claim 1, wherein the plurality of rotating gear members includes a first rotating gear member and a second rotating gear member.

3. A gear assembly as claimed in claim 1, including a first bushing and a second bushing supporting the plurality of rotating gear members.

4. A gear assembly as claimed in claim 3, wherein the wear component is positioned between the first bushing and the second bushing.

5. A gear assembly as claimed in claim 3, wherein the first bushing and the second bushing are disposed within the wear component.

6. A gear assembly as claimed in claim 1, wherein the wear component includes a first portion and a second portion, the plurality of rotating gear members disposed within the first portion of the wear component and supported by the second portion of the wear component.

7. A gear assembly as claimed in claim 6, wherein the second portion of the wear component includes an integrally formed bushing.

8. A gear assembly, comprising:
   a gearbox housing having a bore therein;
   a plurality of rotating gear members mounted within the gearbox housing;
   at least one bushing supporting the plurality of rotating gear members; and
   a wear component, comprising:
      a first portion having an inlet port, an outlet port, and central opening in which the gears of the plurality of rotating gear members are positioned;
      a second portion having a plurality of openings each receiving a different one of the plurality of rotating gear members therethrough; and
      a flow passage extending traversely through the wear component;
   wherein the wear component is slidably disposed within the bore such that the wear component is retained in a desired position when the gear assembly is assembled and is freely removable from the bore when the gear assembly is disassembled to facilitate replacement of the wear component.

9. A gear assembly as claimed in claim 8, wherein the plurality of rotating gear members includes a first rotating gear member and a second rotating gear member.

10. A gear assembly as claimed in claim 8, wherein the second portion of the wear component includes an integrally formed bushing.

11. A gear assembly as claimed in claim 10, wherein the at least one bushing includes a bushing positioned adjacent the first portion.

12. A gear assembly as claimed in claim 10, wherein the at least one bushing includes a bushing disposed at least partially within the first portion of the wear component.

13. A gear assembly as claimed in claim 10, wherein the wear component includes an inlet port and an outlet port formed in the ring-shaped structure.

14. A gear assembly as claimed in claim 10, wherein the wear component is formed of a graphite material.

15. A gear assembly, comprising:
   a gearbox housing having a bore therein;
   first and second gear members rotatably mounted within the gearbox housing;
   a wear component matingly received within the bore and positioned around the first and second gear members to prevent wear between the gear members and an inner surface of the gearbox housing defining the bore; and
   a flow passage extending traversely through the wear component;
   wherein the first and second gear members and the wear component comprise a cartridge assembly configured to be inserted into and removed from the housing through the bore, and wherein the wear component is slidably disposed within the bore such that the wear component is retained in a desired position when the gear assembly is assembled and is freely removable from the bore when the gear assembly is disassembled to facilitate replacement of the wear component.

16. A gear assembly as claimed in claim 15, further comprising a bushing disposed within the bore and having first and second openings through which the first and second gear members extend, respectively, the wear component disposed adjacent the bushing and having an outer diameter substantially equivalent to an outer diameter of the bushing.

17. A gear assembly as claimed in claim 15, further comprising a bushing having an inner portion extending into the wear component and having an outer portion spaced from the wear component by an axial gap to enable the bushing to float relative to the wear component during operation of the gear assembly.

18. A gear assembly as claimed in claim 15 wherein the wear component comprises:
   a first portion having an inlet port, an outlet port, and central opening in which the gears of the first and second gear members are positioned; and
   a second portion having first and second openings through which the first and second gear members extend, respectively.

* * * * *

UNITED STATES PATENT AND TRADEMARK OFFICE
CERTIFICATE OF CORRECTION

| | | |
|---|---|---|
| PATENT NO. | : 7,856,906 B2 | Page 1 of 1 |
| APPLICATION NO. | : 11/755990 | |
| DATED | : December 28, 2010 | |
| INVENTOR(S) | : David A. Payne et al. | |

It is certified that error appears in the above-identified patent and that said Letters Patent is hereby corrected as shown below:

Title page,

The title should read:

--GEAR ASSEMBLY INCLUDING A WEAR COMPONENT FOR USE WITH METAL HOUSINGS--

Signed and Sealed this
Twenty-third Day of August, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,856,906 B2 | Page 1 of 1 |
| APPLICATION NO. | : 11/755990 | |
| DATED | : December 28, 2010 | |
| INVENTOR(S) | : David A. Payne et al. | |

It is certified that error appears in the above-identified patent and that said Letters Patent is hereby corrected as shown below:

Title page, Item (54) and at Column 1, lines 1-3,

The title should read:

--GEAR ASSEMBLY INCLUDING A WEAR COMPONENT FOR USE WITH METAL HOUSINGS--

This certificate supersedes the Certificate of Correction issued August 23, 2011.

Signed and Sealed this
Thirteenth Day of September, 2011

David J. Kappos
*Director of the United States Patent and Trademark Office*